(12) United States Patent
Lennon

(10) Patent No.: US 6,711,590 B1
(45) Date of Patent: Mar. 23, 2004

(54) LINKING METADATA WITH A TIME-SEQUENTIAL DIGITAL SIGNAL

(75) Inventor: Alison Joan Lennon, Balmain (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/330,158

(22) Filed: Jun. 11, 1999

(30) Foreign Application Priority Data

Jul. 10, 1998 (AU) .............................................. PP4621
Jul. 10, 1998 (AU) .............................................. PP4622

(51) Int. Cl.$^7$ ............................................ G06F 17/00
(52) U.S. Cl. ....................... 707/200; 707/203; 709/320; 709/321
(58) Field of Search ........................ 707/1–206; 348/65, 348/708; 709/310–332

(56) References Cited

U.S. PATENT DOCUMENTS 5,832,496 A * 11/1998 Anand et al. ................ 707/102
5,862,325 A * 1/1999 Reed et al. .................. 707/203
5,870,746 A * 2/1999 Knutson et al. ............. 707/101

OTHER PUBLICATIONS www.identive.com/whitepaper.html.*
Mann et al., Implementation of embedded streaming of large video application using object–relational database and PHP, Southeastcon 2000, Proceedings of the IEEE, 2000, pp. 201–204.*
Meisenbacher, RTOM: a real–time DBMS concept, Aerospace and Electronics Conference, 1991, NAECON 1991, Proceedings of the IEEE 1991 National, May 20–24, 1991, pp. 269–274, vol. 1.*
Kapentios, Extracting and providing knowledge within an object–centered scientific information system for atmospheric research, Scientific and Database Systems, 1996, Proceedings, Eighth International Conference on, 18020 Jun. 1996, pp. 198–207.*
"Motion–Adaptive Modelling of Scene Content for Very Low Bit Rate Model–Assisted Coding of Video", Wendi Rabiner, Journal Of Visual Communication And Image Representation, vol. 8, No. 3, Sep., pp. 250–262, 1997.

* cited by examiner

*Primary Examiner*—David Jung
(74) *Attorney, Agent, or Firm*—Fitzpatrick, Cella, Harper & Scinto

(57) ABSTRACT

A method and apparatus for generating a metadata object having links to temporal and spatial extents in a time-sequential digital signal is disclosed. The method includes the following steps. Firstly, identifying an object of interest in the time-sequential digital signal. Secondly, defining a link entity between metadata in the metadata object and the identified object, the link entity forming part of the metadata object. Thirdly, tracking the identified object in the time-sequential digital signal and updating the link entity in the metadata object to include the identified object's new temporal and spatial extent in the time-sequential digital signal. Finally, associating the generated metadata object with the time-sequential digital signal.

46 Claims, 6 Drawing Sheets

LINKING METADATA WITH A TIME-SEQUENTIAL DIGITAL SIGNAL

FIELD OF THE INVENTION

The present invention relates to a method, system and apparatus for linking descriptive information, or metadata, to identified objects within a time-sequential digital signal.

BACKGROUND

It will be appreciated that the word "metadata" used throughout this document is to be construed broadly as data associated with other data, unless a contrary meaning is clearly intended in a particular case. For example, one or more video frames representing a sequence of a person (in the form of object data) walking across a frame can have metadata associated with it. The metadata can take the form of additional data which in some way describes an attribute or content of the video frame or frames. For example, the metadata can relate to information such as the colour of the person's clothes, the person's name (or age or other personal details), or can describe that the person is walking. Whilst metadata can include any form of additional data related to main data, it is preferred that the metadata be in some way descriptive of (or represent a description of) the main data.

As various team sports have become more professional, analysis of teams and individual players by coaches has grown in importance. To this end, coaches and players of a particular team often review video footage of past matches to look for identifiable errors or weaknesses in the team's strategy or game play with a view to rectifying any detected deficiencies through remedial training. Alternatively, or in addition, the movements and team play of opposing teams can be studied in an attempt to identify weaknesses which can be exploited by selection of appropriate game plans.

In the past, such analysis has been done on a relatively ad hoc basis, with coaches typically fast forwarding through video footage of one or more recorded matches. Players are identified by the coach, and manual notes taken on particular aspects of their performance. However, attempting to find the actions of a particular player from the coach's team or an opponent's team is labour intensive, particularly where multiple games need to be viewed.

One solution to this has been to carefully observe each video as it becomes available, and catalogue the appearance of each player and perhaps the action being taken by the player at each appearance. Each player's entry to the field of view in the video is recorded as either a time or frame number with respect to the video tape, and can be accessed later by going directly to the correct point on the video tape. By cataloguing such information in a computer database, it is conceivable that a computer search for a particular player could yield a list of potential points of interest, perhaps spanning a number of video-recorded matches. However, this method is still relatively labour intensive, cumbersome and time consuming. Furthermore, the information required to fill such a database can only be generated off-line after a match, and is not available in real time.

It is an object of the present invention to overcome or at least substantially ameliorate one or more of the disadvantages of the prior art.

SUMMARY OF THE INVENTION

Accordingly, in a first aspect, the present invention provides a method of generating a metadata object having links to temporal and spatial extents in a time-sequential digital signal, the method including the steps of:

identifying an object of interest in the time-sequential digital signal;

defining a link entity between metadata in the metadata object and the identified object, the link entity forming part of the metadata object;

tracking the identified object in the time-sequential digital signal and updating the link entity in the metadata object to include the identified object's new temporal and spatial extent in the time-sequential digital signal; and associating the generated metadata object with the time-sequential digital signal.

Preferably, the time-sequential digital signal defines a series of video frames and the object is identified on the basis of movement against a relatively stationary background in the frames. More preferably, the object is identified by comparing two or more relatively closely temporally spaced video frames from the series of video frames.

Desirably, the object is tracked by maintaining position information related to its position in each frame. Preferably the position information is updated for each frame.

In a preferred embodiment, the method further includes the steps of:

providing predetermined identification information related to the predetermined metadata and one or more objects likely to be identified in the time-sequential digital signal;

attempting to identify the identified object with reference to the identification information; and in the event that an object is identified, including the identification information in the metadata which is linked to the object.

In a second aspect, the present invention provides a system for generating a metadata object having links to temporal and spatial extents in a time-sequential digital video signal defining a series of frames, the system including:

a video source including means for generating the time-sequential digital video signal defining a series of frames;

image processing means for identifying an object of interest having temporal and spatial extents within one or more frames in the digital video signal;

linking means for defining a link entity between the relevant metadata in the metadata object and each identified object, wherein the image processing means are configured to track the object during subsequent frames in the series, whilst the linking means maintains the link entity between the object in each frame and the metadata in the metadata object.

Preferably, the system further includes:

storage means to store predetermined identification information related to one or more classes of objects likely to be identified in the time-sequential digital video signal; and identification means for using the predetermined identification information to recognise the object, whereby, upon recognition of an object, metadata corresponding specifically to that object is linked by a link entity thereto.

Desirably, the video source is a video camera. Preferably, the video camera includes position detection means for generating a movement signal indicative of relative panning or zooming movements of the video camera.

In a third aspect, the present invention provides an apparatus for generating a metadata object having links to temporal and spatial extents in a time-sequential digital video signal defining a series of frames, the apparatus including:

- video source including means for generating the time-sequential digital video signal defining a series of frames;
- image processing means for identifying an object of interest having temporal and spatial extents within one or more frames in the digital video signal;
- link entity means for defining a link entity between each object and the metadata object, wherein the image processing means are configured to track the object during subsequent frames in the series, whilst the link entity means maintains the link entity between the object in each frame and the metadata object.

In a fourth aspect, the present invention provides a computer programming product with a computer readable medium recorded thereon for generating a metadata object having links to temporal and spatial extents in a time-sequential digital signal, said computer programming product including:

- identifying module for identifying an object of interest in the time-sequential digital signal;
- defining module for defining a link entity between metadata in the metadata object and the identified object, the link entity forming part of the metadata object;
- tracking module for tracking the identified object in the time-sequential digital signal and updating the link entity in the metadata object to include the identified object's new temporal and spatial extent in the time-sequential digital signal; and
- associating module for associating the generated metadata object with the time-sequential digital signal.

In a fifth aspect, the present invention provides a method of linking predetermined metadata with a time sequential digital signal defining a series of frames, the method including the steps of:

- utilising the detected difference between two or more relatively closely spaced frames in the series to detect an object in the form of a coherent motion block moving relative to a background in the frames;
- defining a link entity between the object and the metadata; and
- tracking the object during subsequent frames in the series, whilst maintaining the link entity between the object in each frame and the predetermined metadata.

In a sixth aspect, the present invention provides a system for linking metadata with a time-sequential digital video signal defining a series of frames, the system including:

- a video source including means for generating the time-sequential digital video signal defining the series of frames;
- image processing means for utilising a detected difference between two or more relatively closely spaced frames in a series to detect an object in the form of a coherent motion block moving relative to a background in the frames; and
- link entity means for defining a link entity between the object and the metadata, wherein the image processing means are configured to track the object during subsequent frames in the series, whilst the link entity means maintains the link entity between the object in each frame and the metadata.

In a seventh aspect, the present invention provides a method of isolating and tracking predetermined objects in a time-sequential digital signal defined by a series of video frames, the method including the steps of:

- determining an object motion field of a frame relative to a background thereof, the motion field being characterised by a plurality of motion indicators, each of which represents a motion of a spatial region of a plurality of regions of the digital image;
- grouping relatively closely adjacent regions having corresponding motion indicators within a predetermined threshold range of values into one or more object regions; and
- tracking each object region during subsequent video frames of the series.

In a eighth aspect, the present invention provides a method of tracking objects in a time-sequential digital signal originally captured by a capture device, the method including the steps of:

- determining a motion vector field for selected time instances of the time-sequential digital signal;
- removing components arising from motion of the capture device during capture from the motion vector field, thereby to generate an object motion field;
- identifying regions of coherent motion in the object motion field, thereby to identify corresponding moving objects;
- selecting one or more of the moving objects; and
- applying an image processing tracking method to each selected object during subsequent time instances of the time-sequential digital signal.

In a ninth aspect, the present invention provides An apparatus for linking metadata with a time-sequential digital video signal defining a series of frames, the apparatus including:

- a video source including means for generating the time-sequential digital video signal defining the series of frames;
- image processing means for utilising a detected difference between two or more relatively closely spaced frames in a series to detect an object in the form of a coherent motion block moving relative to a background in the frames; and
- link entity means for defining a link entity between the object and the metadata, wherein the image processing means are configured to track the object during subsequent frames in the series, whilst the link entity means maintains the link entity between the object in each frame and the metadata.

In a tenth aspect, the present invention provides a computer programming product with a computer readable medium recorded thereon for linking predetermined metadata with a time sequential digital signal defining a series of frames, said computer programming product including:

- utilising module for utilising the detected difference between two or more relatively closely spaced frames in the series to detect an object in the form of a coherent motion block moving relative to a background in the frames;
- defining module for defining a link entity between the object and the metadata; and
- tracking module for tracking the object during subsequent frames in the series, whilst maintaining the link entity between the object in each frame and the predetermined metadata.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

Figure 1:
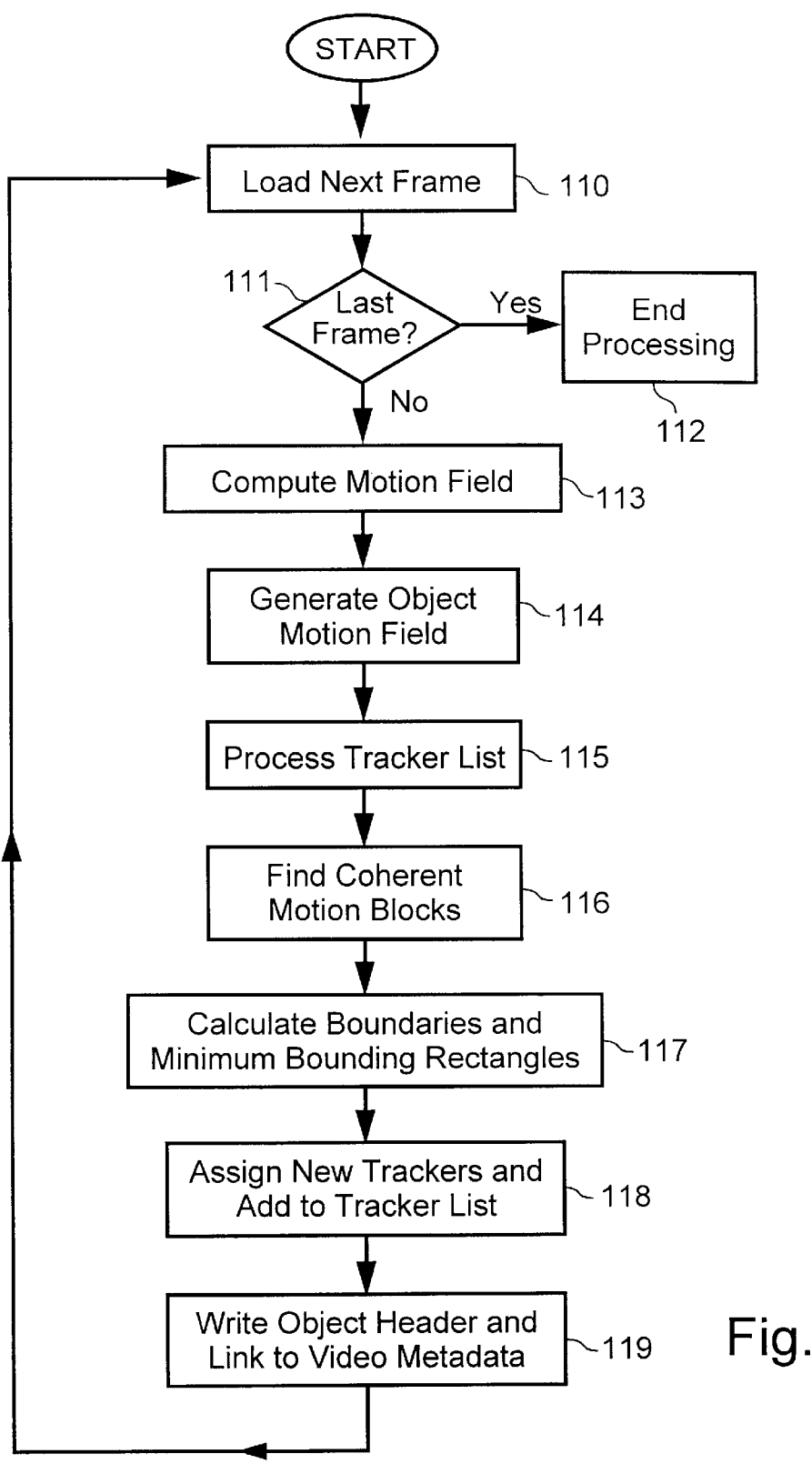
FIG. 1 is a flowchart showing a method of linking metadata with a time-sequential digital signal defining a series of frames.

The present invention relates to a method of linking metadata with a time-sequential digital signal. Typically, the time-sequential digital signal will be a video signal in any of a number of known formats. The time-sequential digital signal defines a series of individual frames, or at least objects, which are presented sequentially on a monitor or other display device. Changes between each frame or object are interpreted by the human eye as motion.

The present invention has been developed primarily for use in describing and cataloguing video footage of a team game such as soccer or Australian Rules football, thereby enabling automatic identification of spatially and temporally defined sections, or extents, of a video in which individual players are visible or undertaking a particular action. However, although the invention will be described hereinafter with reference to this particular application, it will be appreciated that the invention is not limited to this field of use.

In its simplest form, the motion described above takes the form of an object moving across a still background. An example is a static image of a furnished room, with a person walking across the foreground. In this case, the person is easily discernible by a viewer as the moving object, whilst the background (ie. the room) does not appear to move.

Conversely, when a camera pans across a relatively steady scene, such as a landscape, although the camera itself is panning, the human eye will tend to interpret this as movement of an observer's point of focus, rather than movement of the scene itself. Thus there is no moving object as such.

Another example is where a moving object is substantially tracked by a camera, whilst moving relative to a background. An example of this is a person playing rugby union, running whilst holding the ball. The camera will tend to generally follow the person holding the ball, which will require the camera to pan across the background sports frame. The person with the ball is generally centred in the frame, or placed only a short distance away from the centre, depending upon contextual needs as ascertained by a director. For example, if the person holding the ball is running relatively close to a sideline, the camera operator will typically select a view which includes the running player at one side of the video frame adjacent the sideline, with the other supporting and opposing players appearing in the remaining majority of the video view.

A final example is where the camera is panning in one direction whilst an object is moving in a different direction. An example of such a scenario might be an opponent coming in to tackle the person running with the ball described above.

The present invention is related to the detection of such moving objects, including players in team sports, cars in motor racing, and other moving objects relative to a background.

Appendix A shows an extensible Mark-up Language (XML) Document Type Definition (DTD) which defines a description scheme for use in implementing the preferred embodiment for an Australian Rules football game. The DTD contains definitions of descriptive elements that can be used in the description of the game. The descriptive elements are defined using the syntax "<!ELEMENT Element Name>" (eg. page 23, line 21), where element name is the name of the descriptive element being defined. Each definition can include the definition of a set of attributes that are associated with the descriptive element. Attribute definitions for a specified descriptive element begin with the syntax "<!ATTLIST Element Name>" (eg. page 23, line 22).

Appendix B shows a metadata object in the form of an XML document generated for a portion of a specific Australian Rules football game using the descriptive scheme defined by the DTD file of Appendix A. The metadata object in this case defines two "plays" which occurred during a first quarter of the game. The first of the plays (page 25, lines 20 to 25) records that player no. 21 took a mark (caught the ball). A link or pointer (page 25, line 25) points to a locator (page 25, lines 41 to 48). The locator (page 25, lines 41 to 48) contains a spatio-temporal extent (page 25, lines 42 to 48) which defines the x and y coordinates of the top left corner and the height and width of a minimum bounding rectangle which contains the identified object, and the temporal range of the time-sequential digital signal to which the defined rectangle applies. (ie, the starting and ending frames of the extent). An extent identifies a section of the time-sequential digital signal, and so a spatio-temporal extent identifies a section of a time-sequential digital signal that has a spatial (ie, 2-dimensional) and a temporal localisation. A locator is defined to be a reference to any specified extent that can be identified using a unique identifier (eg, the first locator for the play identified by id "P1" is identified by the id "L1"). Whilst there are advantages to be had in separating the extent locators from the plays, it will be appreciated that each extent locator can be recorded immediately adjacent its associated play data, or in any other convenient format or location.

Referring to the drawings (and appendices as required), FIG. 1 shows a flowchart for implementing a preferred embodiment of the present invention. Initially, the first frame in the video is loaded (step 110). If the last frame has already been processed and therefore no frame is able to be loaded (step 111), the processing ends (step 112). If a frame is able to be loaded (step 111), then a motion field is computed (step 113), and the camera motion is subtracted to generate an object motion field (step 114). Following this, any previously detected objects which are being tracked are processed. Each of these objects has a particular tracker assigned to it, and all the current trackers are maintained on a tracker list. A tracker is an image processing entity which attempts to follow or track an object in the time-sequential digital signal once it has been identified as an object to be tracked. Once the tracker list has been processed (step 115), the remaining objects in the object motion field that warrant tracking are identified (step 116).

The boundaries of any objects found in the object motion field during step 116 are calculated, and minimum bounding rectangles (described below) are generated for newly identified regions (step 117). Following this, any new regions detected have a tracker assigned to them and the new tracker is added to the tracker list (step 118). An object header and first link entity between the time-sequential digital signal and the metadata are then written in the metadata object (step 119). In terms of the example shown in Appendix B, the object header refers to the creating of a new "Play" element in the metadata object, which is uniquely identified with an id (eg,"P1"), and the first link entity refers to the first "CLINK" element which is contained within the identified "Play" element. The method returns to step 110 and is repeated until the last frame is reached.

The DTD defines a tag which specifies the beginning of a new "tracked" section of interest. In the case of the DTD in Appendix A, this element is the "Play" element (eg. page 25, line 20). The "Play" element is defined to have attributes which further describe the section of play (eg. player ID, type of play, an annotator's name), and one or more links (eg. page 25, line 25) to identified spatio-temporal extents in the digital video. In another embodiment the information stored as attributes of the "Play" element can be represented as child elements of the "Play" element (ie. they can be contained within the <Play> element).

Figure 2:
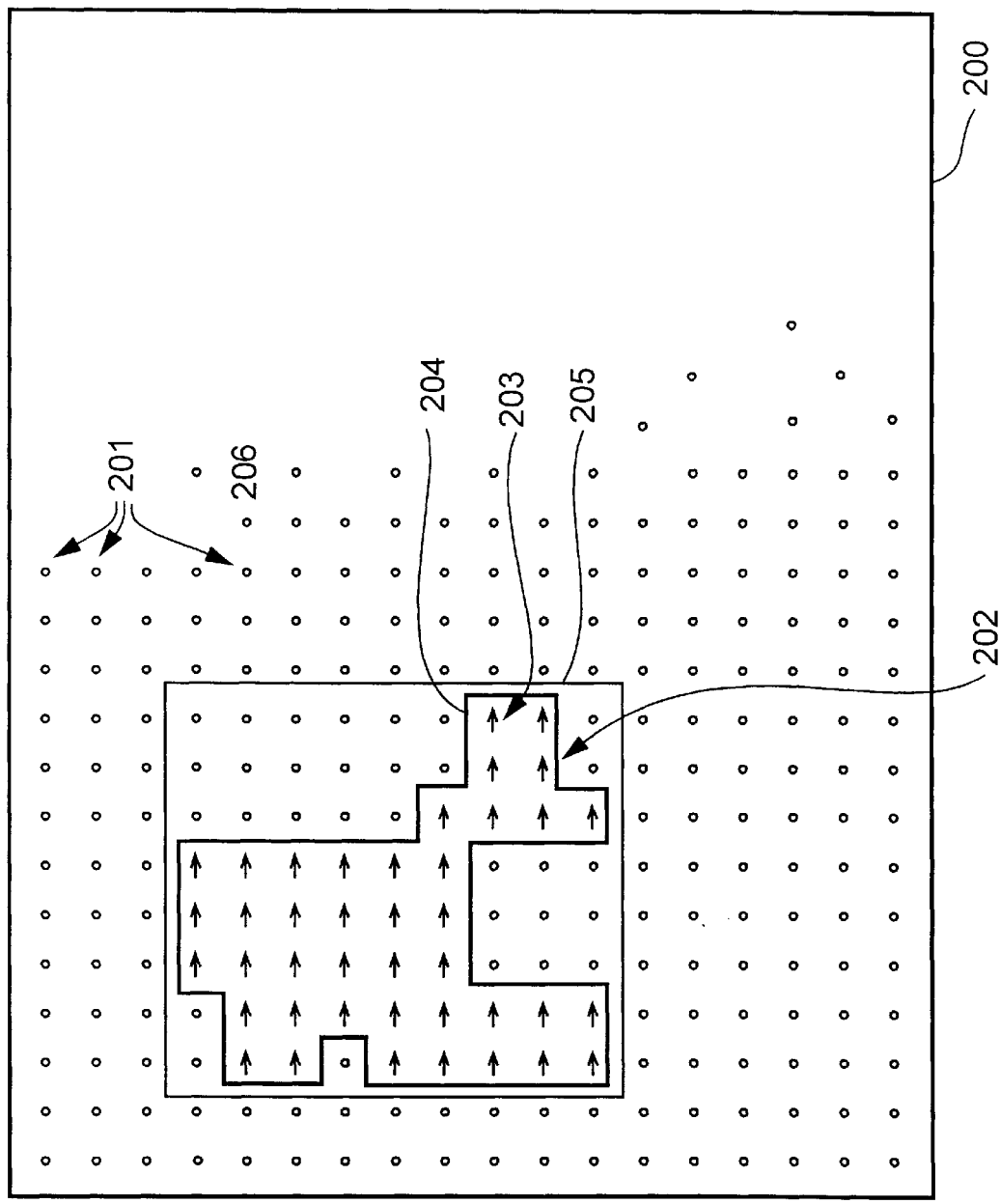
FIG. 2 shows an object motion field having a block of coherent motion defined by boundary, and an associated minimum bounding rectangle, as detected using the method shown in FIG. 1.

Turning to FIG. 2, there is shown an object motion field 200, as generated in step 114 of FIG. 1. The object motion field is obtained by removing any camera motion from a calculated motion field, which can be calculated for each frame. A motion field can be calculated for each frame using a technique such as optical flow which is known to those skilled in the art of digital video analysis.

The object motion field 200 shows a block of coherent motion in forming an object 202 within a surrounding static area 206 (indicated by dots 201). The coherent motion block or object 202 consists of two-dimensional motion vectors 203, and is surrounded by a boundary 204. A minimum bounding rectangle 205 is also shown for the object 202. This object motion field can be calculated for each frame by removing any camera motion from the calculated motion field for a particular frame. A preferred method of generating an object motion field is described below, but any other technique known to those skilled in the art of video analysis can be used.

The particular method by which objects are detected is not critical. Objects might also be detected using other spectral sensors (eg. infrared), or using signals transmitted by wireless transmitters associated with objects of interest. However, it is advantageous to use a system which enables movement relative to a background to be discriminated whilst ignoring apparent movement of the background itself due to panning or zooming of a video camera.

Whilst such discrimination is achievable in software, it is also possible to provide the video camera used to record an event with some form of panning and/or zoom output. If analysis of the video data is performed in the camera then information about the actual motion of the camera (pan, zoom, etc) can be made available for the analysis. In such cases, this information is used to remove the camera motion from the calculated motion field (step 113 in FIG. 1). Such a camera includes position detection means based, for example, on an internal gyroscope or arrangement of accelerometers which measure movement of the camera with respect to an initial rest position. The position detection means generates a movement signal indicative of relative panning movements of the camera. The movement signal is used in step 114 of FIG. 1 to remove panning induced differences between adjacent frames. The availability of information regarding camera motion eliminates the requirement for camera motion to be calculated algorithmically from a knowledge of the pixel data alone and therefore would result in more robust object detection.

In the event that camera motion information is not available (eg., the camera does not provide the information or the analysis is being performed away from the camera), then image processing methods are known for the estimation of camera motion from calculated motion fields. Some of these methods are designed to be implemented in the compressed domain (eg., in MPEG-2 video format), as will be appreciated by those skilled in the art of video analysis. One such method is described in the article "Motion-Adaptive Modelling of Scene Content for Very Low Bit Rate Model-Assisted Coding of Video", by Wendi Rabiner and Arnaud Jacquin (Published in the 'Journal of Visual Communication and Image Representation, Vol 18, No. 3, at pp250–262).

Links between the identified object in the time-sequential digital signal and the relevant metadata in the metadata object can be created in many ways. The preferred procedure for creating such links is to create a tagged link element in the metadata object which is contained in (ie., is a member of) an identified section of play (ie., a tracked object). This link element contains references to spatio-temporal extents in the video footage. A simple spatio-temporal extent can be specified by a starting and ending frame number and a position and size of a minimum bounding rectangle. A link entity can be updated by simply incrementing the ending frame number if the bounding spatial region is unchanged in size or position, or by adding a new link element to the tagged identified section of play which contains a reference to the new spatio-temporal extent.

After updating existing link entities between previously detected objects and corresponding metadata, new objects 202 in the object motion field 201 are detected in step 116. This can be done in a number of known ways. One method is based on existing region-growing methods used in image segmentation. In this method the motion field is examined on a raster pixel basis. A pixel is added to the previous region (or block) if its motion vector (magnitude and direction) differ from the means of the motion vectors of the pixels already in the region by less than some specified direction and magnitude thresholds. This simple method can be enhanced by selecting "seed" pixels for the region growing based on peak magnitudes in the motion field. These methods of region growing, and seeded region-growing segmentation, are well known to those skilled in the art of image segmentation. Rules may be applied to reject objects which are clearly too small or at an incorrect position in the video frame to be relevant, thereby reducing the likelihood of inappropriate identification. In this way, in the example of a sports match being recorded, a bird flying overhead or movement in a crowd of supporters is not detected, even though some movement occurs between adjacent frames.

In a preferred embodiment, objects are encapsulated in a minimum bounding rectangle (step 117, FIG. 1). In particular, each object 202 can be identified by two pairs of grid coordinates identifying respective opposite corners of the minimum bounding rectangle. In effect, this provides both position and size information for the rectangle.

Alternatively, one pair of grid coordinates can be used to provide position information whilst a height value and a width value define the rectangle's size. The use of a bounding rectangle to spatially identify the object (player) of interest eliminates the need to obtain accurate object boundaries using image processing methods. However, if accurate boundaries of objects could be determined then references to these extents can be used.

The metadata object can be "packaged" into the encoded time-sequential digital signal. The link entities contained in the metadata object can be used to relate a particular spatial region in a TV broadcast to any additional information. In that case, each link has two link ends, one of which is associated with the time-sequential digital signal and the other of which is associated with the additional information in the metadata.

In its simplest form, the metadata simply tags the existence of each object of interest in the time-sequential digital signal. This tag preferably is identified by a number or other symbol which distinguishes the object from any other objects in the same time-sequential digital signal. However, other types of metadata can also be used, as discussed in greater detail below.

The result of removal of panning information is shown in FIG. 2. Here, the difference between a pair of adjacent frames, minus panning or zoom induced differences, results in an object motion field 200 having a relatively large static area 206 (indicated by dots 201) and a relatively small object 202. The object 202 consists of two-dimensional motion vectors 203 which indicate, in this case, that the coherent block 202 is moving to the right of the frame. The boundary 204 defines the extent of the object 202 and can form a basis upon which to detect the same object in a subsequent frame during step 115 of FIG. 1. As discussed above, the minimum bounding rectangle 205 enables reduced processing and easier addressing of the size and location of each detected object. It will be appreciated the boundaries other than rectangles can be used.

Figure 3:
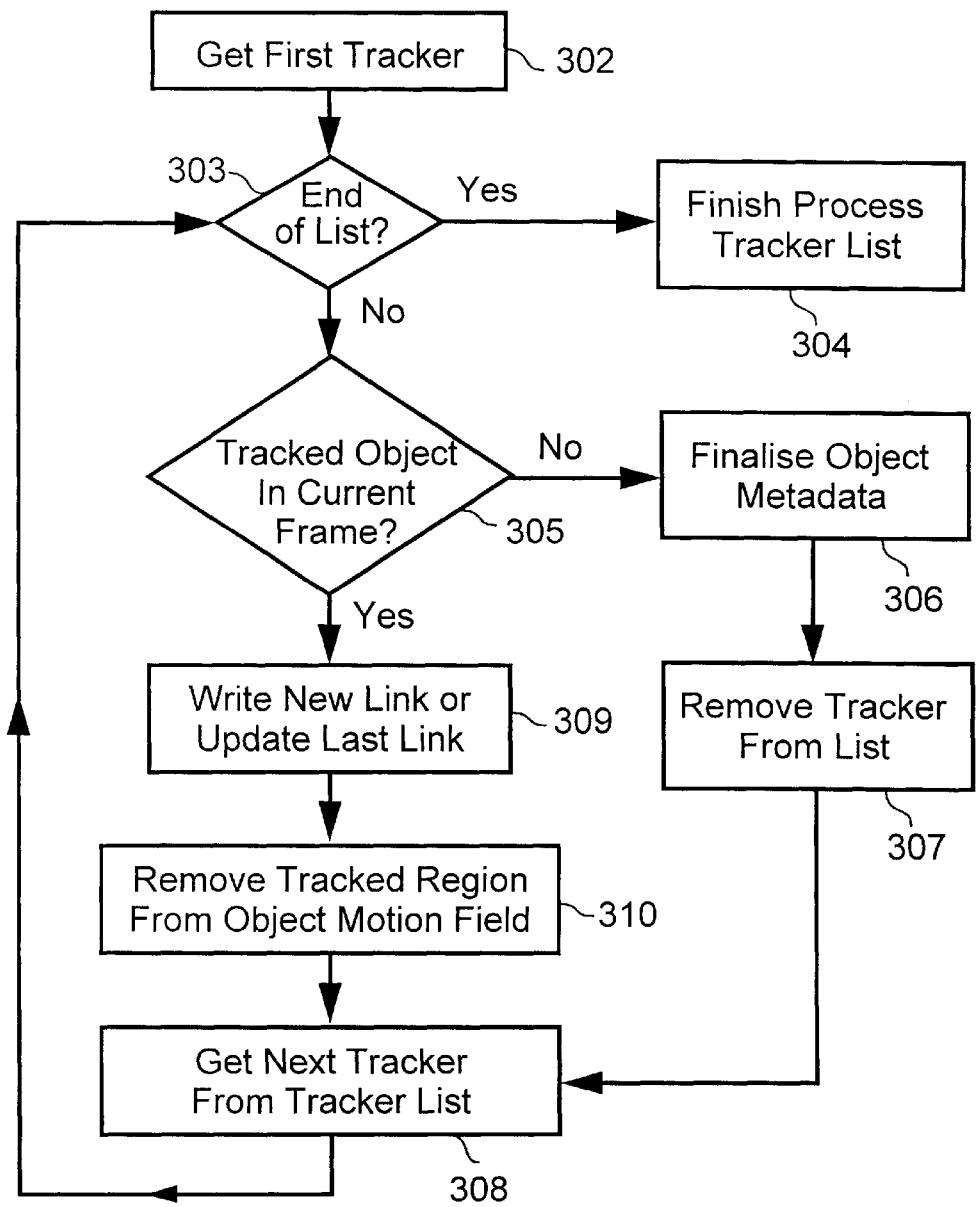
FIG. 3 is a flowchart showing details of the "process tracker list" step designated 115 in FIG. 1.

The substeps shown in FIG. 3 update metadata for objects 202 identified in a previous video frame(s). A frame will often contain multiple objects, and accordingly has multiple trackers associated with it. The first step is to obtain the first tracker from a tracker list (step 302). The tracker list is a list of trackers associated with the objects identified in the previous frame, and includes trackers generated many frames previously or any trackers generated as a result of new objects 202 being found in the previous frame. Assuming at least one tracker exists for the frame, the video frame (201, FIG. 2) is inspected to see whether the object 202 corresponding to the tracker under consideration can be located. In the preferred embodiment, the attempt to locate the object being tracked is based on a correlation calculation in a region around the location of the object in the previous frame. If the object 202 is located, then, as discussed in relation to step 304, the link entity in the metadata is updated to take into account any movement of the object from the last frame.

After step 305, the object 202 for which the update took place is removed from the object motion field 201 (step 310, FIG. 3) or is in some other way removed from further consideration in relation to the current frame. Thus, the object is not considered as a new object in step 116 of FIG. 1.

The next tracker in the list is then obtained (step 308, FIG. 3) and processed, until all trackers in the list have been processed. At that stage, the method moves on to step 116 (FIG. 1) in which any remaining objects 202 in the object motion field are investigated.

In the event that step 305 does not locate the object 202 which is associated with the current tracker, that object's metadata is finalised (step 306), and the tracker removed from the list (step 307).

Once the entire frame has been processed for existing and new objects 202, the next frame is inspected.

Figure 4:
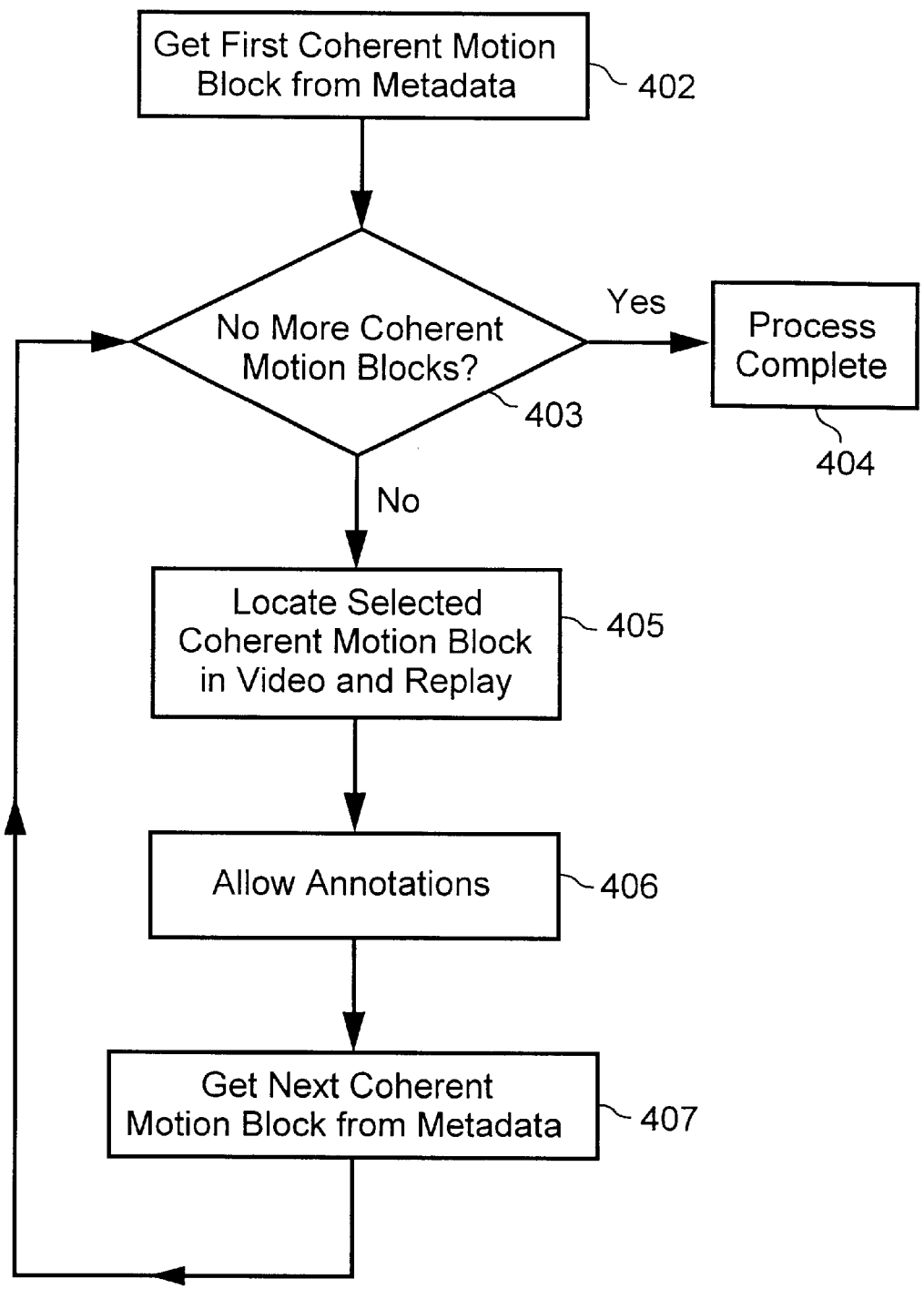
FIG. 4 is a flowchart showing a method of annotating objects for use with the method shown in FIG. 1.
Figure 5:
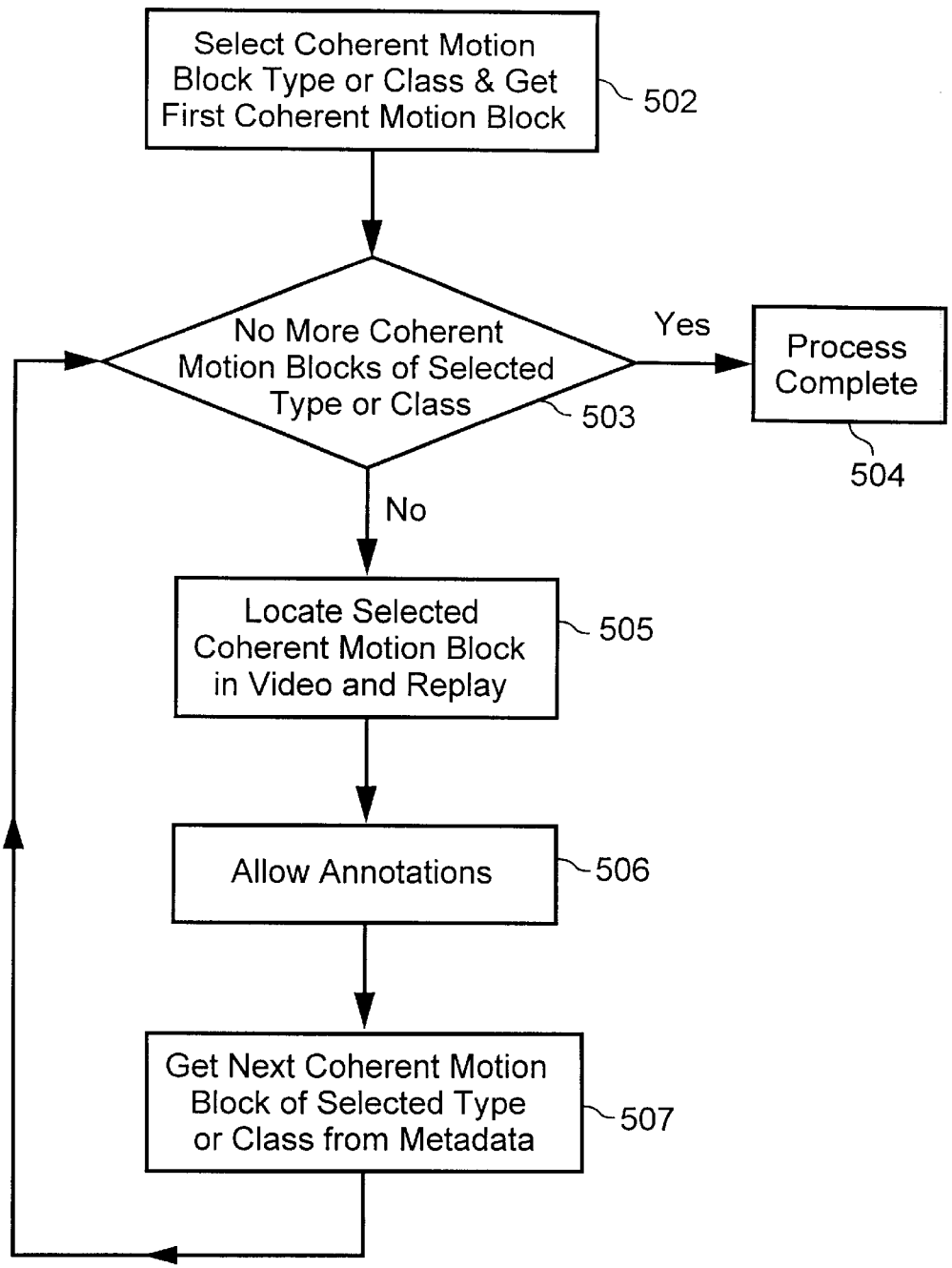
FIG. 5 is a flowchart showing an alternative method of annotating objects for use with the method shown in FIG. 1.

In a further embodiment of the invention, shown in FIGS. 4 and 5, the metadata associated with various objects 202 includes predetermined identification information. The predetermined identification information is preferably related to the types or classes of objects 202 likely to be detected, or even the types of movement expected of the objects, given the nature of the video. For example, in a game such as soccer or Australian Rules Football, the predetermined information could be used to identify players based on the numbers on their jerseys or by some other identified signal. The predetermined identification information can also be related to the particular players expected, given the teams playing.

An attempt is made to identify each object 202 by searching for a unique identifying feature associated therewith. In the case of a football game, each player is normally uniquely identified by a number on his jersey. By using known object recognition techniques, the number on the jersey, and thereby the corresponding player, can be identified. These numbers are typically large and clear enough for TV viewers to be able to identify players in a broadcast game. This information can then be added to the metadata which is linked to the object. In a basic form, the link entity simply links the identified object to a suitable tag which preferably contains the player's name or some other suitable ID. Alternatively, or in addition, other details related to the player can also be linked to the recognised object, such as the player's age, number of matches, or even statistical information based on previous applications of the preferred embodiment to other matches or the match presently being processed.

Alternatively, or in addition, additional metadata can be added manually to the metadata, as discussed below in relation to FIGS. 4 and 5. For example, it might not be possible to classify the type of play from the video signal. This information, however, may be valuable for statistical purposes. Consequently, a procedure can be used to add additional information (i.e., annotate) to the previously tagged objects.

The generated metadata can be stored separately and loosely associated with the time-sequential digital signal. Alternatively the metadata can be packaged with the encoded time-sequential digital signal. For example, it is possible to store some private data in an MPEG-2 stream, and facilities for storing associated metadata are being considered for the MPEG-4 standard. The exact location and method by which the metadata object is stored with respect to the time-sequential digital signal is not critical to the invention. A number of potential formats and schemes in addition to those described herein will be readily apparent to those skilled in the art of video encoding and transmission.

FIG. 4 illustrates the steps in a procedure for linearly annotating objects 202 identified in frames of the video. The first step is to obtain the first object (step 402). If no object is found (step 403) the process is completed (step 404). If a object is found, the next step is to go to the location of the object in the video and replay the footage in which it appears (step 405). Following this, annotations can be made to metadata associated with the object under consideration (step 406). Once annotation has been completed, the next object in the metadata stream is retrieved (step 407). The procedure then returns to step 403 and continues until all objects have been processed.

In the procedure shown in FIG. 4, a list of all objects discovered in the frames of the video is inspected on a sequential basis. Multiple occurrences of the same object in a video are treated as separate, as are multiple detected objects within a single frame. The frames in which the first object appears are retrieved from the video (step 404) either by fast forwarding in the case of video tape or random access where the video is stored on a hard drive or in solid state memory. In the case of, say, a soccer match, where multiple players and therefore multiple objects can exist in a given frame, the selected object 202 can visually be highlighted, perhaps by displaying the associated minimum bounding rectangle 205 in a solid contrasting colour. This ensures that the operator of the system knows precisely which player in the current frame the annotation is to relate to.

In step 402, the annotations are added. The annotations are added by text input through a keyboard or using voice recognition software. Alternatively, a limited number of possible annotations are provided, allowing for "hot key" annotation using a relatively small number of keys or buttons. For example, in soccer, a key is assigned to each of such actions as passing, dribbling, shooting, tackling and many others. By pressing an appropriate key, a code representing the action being taken by the selected player in the tracked play of interest is added to the metadata.

Also, where automatic player identification is not used or where the method has been unable to recognise a particular object 202 in a given video frame, the operator can manually add information identifying the player.

Step 407 is then taken, in which the next object in the metadata stream is selected. By using simple forward and backwards control keys, such as preselected keys on a computer keyboard, the operator can easily move between adjacent instances of objects, and add or edit metadata annotations associated therewith.

FIG. 5 shows a procedure for non-linear annotation of metadata. Initially, a particular class or type of object 202 is selected for annotation (step 502). If there are no instances of coherent blocks falling within that class (step 503), the process is completed (step 504). If an instance of a object 202 of the requisite type or class is found, it is located in the video and replayed (step 505). Annotations can be made to metadata associated with the object under consideration (step 506). Following this, the next instance of an object 202 of the requisite class or type is retrieved (step 507), at which point the procedure returns to step 503. The procedure continues until all objects 202 of the selected class or type have been annotated.

In FIG. 5, non-linear access is provided whereby the metadata includes identification information beyond a mere tag. This includes, for example, the situation where players have automatically or manually been identified, perhaps by the numbers on their jerseys, or where the team which each detected player belongs to has been identified. In this method, at step 502, required information is selected, such as the identity of a particular player. The next object 202 satisfying this requirement is located in the video, either by fast forwarding or random access as appropriate, with the selected object 202 being highlighted (step 505) as discussed above in relation to step 405 of FIG. 4. The metadata associated with the selected object can then be edited or added to, as described in relation to step 406 of FIG. 4. When annotation of the particular object is completed, the operator can move to the next object 202 satisfying the selected requirements (step 507) as described in relation to step 407 of FIG. 4. When all instances of coherent motion objects satisfying the requirements have been satisfied, the process is completed (step 504).

The preferred embodiment allows for substantially easier generation of match statistics, and allows a coach to generate video presentations concentrating an any of a large number of statistics. For example, each player in the team can be provided with a summary video recording of his or her performance in a particular match. Alternatively, where the metadata is configured to include information on the particular action or play involved, a coach can select, for example, all instances in which the team took marks. The scope for customised presentation of raw match footage is defined by the amount and type of information recorded for each object identified.

In a further embodiment of the present invention, the metadata can be made available to viewers of broadcasts. For example, when a soccer game is broadcast to a television audience, the metadata can also be provided to suitably configured television sets (eg. via TELETEXT (trade mark), digital data broadcast, or the like). Typically, the metadata will be down loaded prior to the game taking place, although it may also be provided during the broadcast as either a separate transmission or interleaved with the video signal in a known manner. Also, private data frames such as those permitted in MPEG encoding and the like can be used for transmission of metadata.

Whilst watching the game on television or other display (not shown), a viewer uses a mouse or other input device (not shown) to select a visible player. Selecting a particular player provides the viewer with information such as the player's name, the name of the team for which he is playing, statistical information relating to the player's age, origins and achievements, and even current information related to the player's performance in the present game. This information can be provided on a window-like region on the television or a hand-held personal viewer separate from the main viewing screen.

Figure 6:
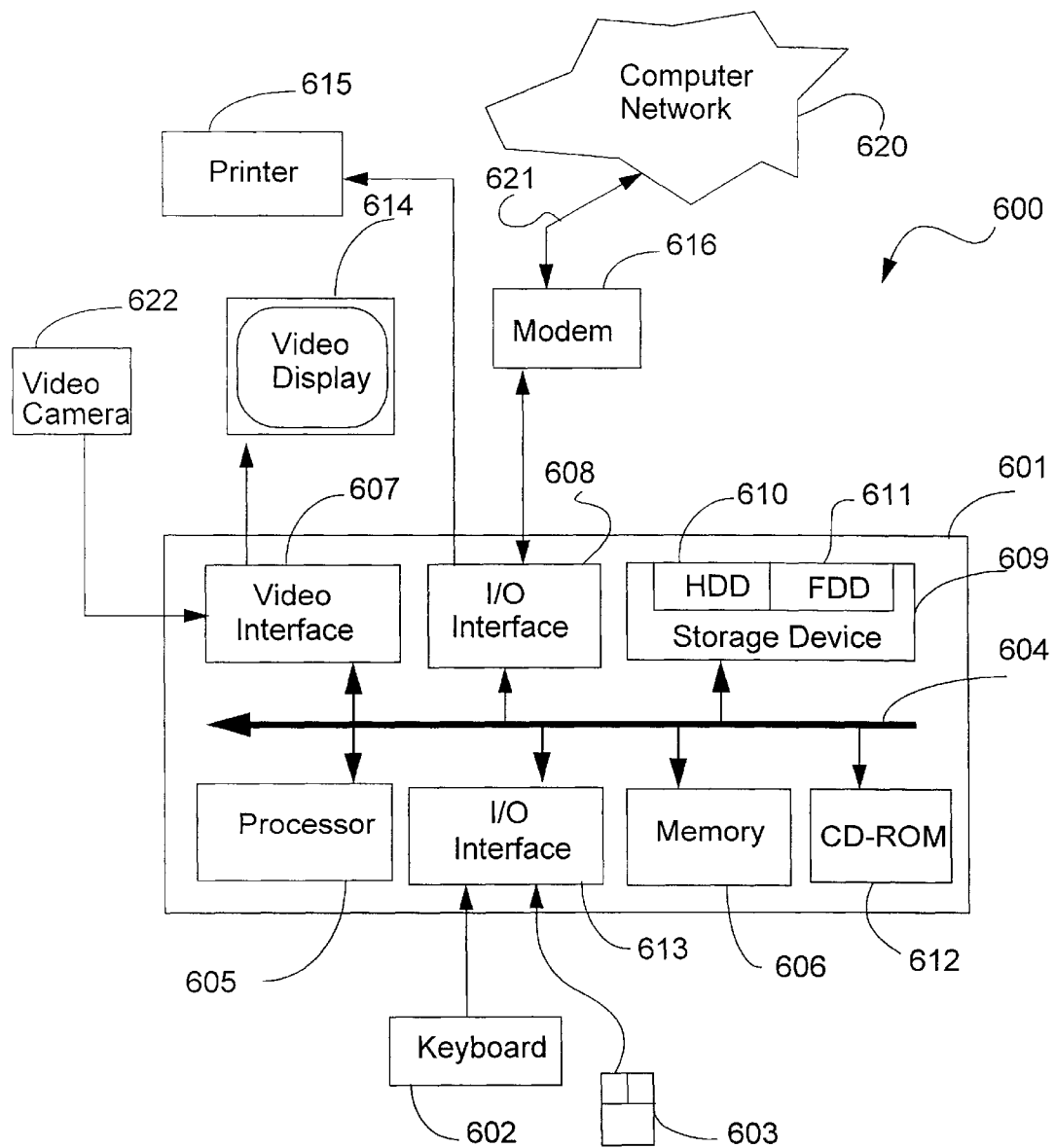
FIG. 6 is a schematic block diagram of a general purpose computer upon which the preferred embodiment of the present invention can be practiced.

The methods of the embodiments are preferably practiced using a conventional general-purpose computer system 600, such as that shown in FIG. 6 wherein the processes described with reference to FIGS. 1 to 5 and Appendices A to B can be implemented as software, such as an application program executing within the computer system 600. In particular, the steps of the method of FIG. 1 are effected by instructions in the software that are carried out by the computer. The software may be divided into two separate parts; one part for carrying out the linking methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for linking metadata with a time-sequential digital signal in accordance with the embodiments of the invention.

The system 600 comprises a computer module 601, input devices such as a keyboard 602, output devices including a printer 615 and a display device 614. A Modulator-Demodulator (Modem) transceiver device 616 is used by the computer module 601 for communicating to and from a communications network 620, for example connectable via a telephone line 621 or other functional medium. The modem 616 can be used to obtain access to the Internet, and other network systems, such as a Local Area Network (LAN) or a Wide Area Network (WAN). The system 600 also includes a video camera 622 for generating the time-sequential digital video signal defining a series of frames in accordance with the embodiments of the present invention.

The computer module 601 typically includes at least one processor unit 605, a memory unit 606, for example formed from semiconductor random access memory (RAM) and read only memory (ROM), input/output (I/O) interfaces including a video interface 607, and an I/O interface 613 for the keyboard 602 and optionally a joystick (not illustrated), and an interface 608 for the modem 616. A storage device 609 is provided and typically includes a hard disk drive 610 and a floppy disk drive 611. A magnetic tape drive (not illustrated) may also be used. A CD-ROM drive 612 is typically provided as a non-volatile source of data. The components 605 to 613 of the computer module 601, typically communicate via an interconnected bus 604 and in a manner which results in a conventional mode of operation of the computer system 600 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 610 and read and controlled in its execution by the processor 605. Intermediate storage of the program and any data fetched from the network 620 may be accomplished using the semiconductor memory 606, possibly in concert with the hard disk drive 610. In some instances, the application program may be supplied to the user encoded on a CD-ROM or floppy disk and read via the corresponding drive 612 or 611, or alternatively may be read by the user from the network 620 via the modem device 616. Still further, the software can also be loaded into the computer system 600 from other computer readable medium including magnetic tape, a ROM or integrated circuit, a magneto-optical disk, a radio or infra-red transmission channel between the computer module 601 and another device, a computer readable card such as a PCMCIA card, and the Internet and Intranets including email transmissions and information recorded on websites and the like. The foregoing is merely exemplary of relevant computer readable mediums. Other computer readable mediums may be practised without departing from the scope and spirit of the invention.

The method of linking metadata with a time-sequential digital signal may alternatively be implemented in dedicated hardware such as one or more integrated circuits performing the functions or sub functions of FIGS. 1 to 5. Such dedicated hardware may include graphic processors, digital signal processors, or one or more microprocessors and associated memories.

Although the invention has been described with reference to a number of specific examples, it will be appreciated that the invention can be embodied in many other forms. For example, the system 600 can be incorporated in a video camera unit (not illustrated). The video camera unit can be portable and can be used by a camera operator to record a sporting event.

APPENDIX A

```
<! -- Copyright © 1998 Canon Information Systems Research Australia (CISRA) -->
<! -- This is a an XML DTD for use in description of a game of Australian Rules
Football. It allows the description and linking of sections of the game involving a
single player. -->
<!-------------------------------------------------------------------
Scheme specific entities
-------------------------------------------------------------------
<!ENTITY % PlayType "Mark | Kick | Handball | Tackle)" >
<!-------------------------------------------------------------------
Element definitions
-------------------------------------------------------------------
<!ELEMENT AFLGamesDescription (Game, Locator*) >
<!ATTLIST AFLgameDescription
        id              ID              #IMPLIED
        resource        ENTITY          #REQUIRED
>
<!ELEMENT Game (Quarter*) >
<!ATTLIST Game
        id              ID              #IMPLIED
        location        CDATA           #IMPLIED
        team1Name       CDATA           #IMPLIED
        team2Name       CDATA           #IMPLIED
        date            CDATA           #IMPLIED
>
<!ELEMENT Quarter (Play*) >
<!ATTLIST Quarter
        id              ID              #IMPLIED
        startTime       CDATA           #IMPLIED
        endTime         CDATA           #IMPLIED
>
> !ELEMENT Play (Clink*).
> !ATTLIST play
        playerID        CDATA           #IMPLIED
        playType        % PlayTapes:    #IMPLIED
        annotator       CDATA           #IMPLIED
>
```

APPENDIX A-continued

```
< !ELEMENT Clink (#PCDATA) >
< !ATTLIST Clink
        id              ID          #IMPLIED
        linkend         IDREF       #IMPLIED
>
< !ELEMENT Locator (VideoExtent +) >
< !ATTLIST Locator
        id              ID          #IMPLIED
        resource        ENTITY      #REQUIRED
>
< !ELEMENT VideoExtent(EMPTY) >
< !ATTLIST VideoExtent
        id              ID          #IMPLIED
        frameStart      CDATA       #REQUIRED
        frameEnd        CDATA       #REQUIRED
        XO              CDATA       #REQUIRED
        YO              CDATA       #REQUIRED
        height          CDATA       #REQUIRED
        width           CDATA       #REQUIRED
```

APPENDIX B

```
< !-- Copyright © 1998 Canon Information Systems Research Australia (CISRA) -->
< !-- This is a sample XML document that describes a game of Australian Rules Football
according to the scheme in the DTD included in Appendix A. -->
< ?xml version = "1.0" standalone = "no"? >
< !DOCTYPE AFLGameDescription SYSTEM "AFLGame.dtd" [
< !ENTITY Match Video SYSTEM "MatchVideo.mpg" NDATA MPEG2 >
] >
< AFLGameDescription resource = "MatchVideo" >
        < !-- A description of the game is contained in this section -- >
        < Game
            location = "Sydney Cricket Ground"
            team1Name = "Sydney Swans"
            team2Name = "West Coast Eagles"
            date = "1998-08-09" >
            < !-- Now add play information with links -- >
            < Quarter id = "Q1" >
              < Play
                id = "P1"
                playerId = "21"
                playType = Mark
                annotator = "John Smith"
                < CLink linkend = "L1"/ >
              < /Play >
              < Play
                id = "P2"
                playerId = "5"
                playType = Kick
                annotator = "Joe Bloggs" >
                < CLink linkend = "L2"/ >
              < /Play >
            < /Quarter >
            < Quarter id = "Q2" > . . . < /Quarter >
            < Quarter id = "Q3" > . . . < /Quarter >
            < Quarter id = "Q4" > . . . < /Quarter >
        < /Game >
        < !—This section now contains the linkends for the various plays -- >
        < Locator id = "L1" resource = "MatchVideo" >
            < VideoExtent
                frameStart = "0"
                frameEnd = "10"
                X0 = "50"
                Y0 = "50"
                height = "100"
                width = "100"/ >
            < VideoExtent >
                frameStart = "11"
                frameEnd = "32"
                X0 = "80"
                Y0 = "100"
                height = "100"
                width = "40"/ >
```

APPENDIX B-continued

```
< Locator >
    < Locator id = "L2" resource = "MatchVideo" >
        < VideoExtent >
            frameStart = "0"
            frameEnd = "25"
            X0 = "200"
            Y0 = "150"
            height = "80"
            width = "30"/ >
    < Locator >
< ? AFLGameDescription >
```

What is claimed is:

1. A method of generating a hypertext metadata object having links to temporal and spatial extents in a time-sequential digital signal, the method including the steps of:
    identifying an object of interest in the time-sequential digital signal upon the object of interest being first detected in the time-sequential digital signal;
    creating at least one metadata element in the hypertext metadata object;
    defining a link entity between the at least one metadata element in the hypertext metadata object and the identified object of interest, the link entity forming part of the hypertext metadata object;
    tracking the object of interest in the time-sequential digital signal and updating the link entity in the hypertext metadata object to include a new temporal and spatial extent of the object of interest in the time-sequential digital signal; and
    associating the hypertext metadata object with the time-sequential digital signal.

2. A method according to claim 1, wherein the time-sequential digital signal defines a series of video frames and the object of interest is identified on the basis of movement against a relatively stationary background in the frames.

3. A method according to claim 2, wherein the object of interest is identified by comparing two or more relatively closely temporally spaced video frames from the series of video frames.

4. A method according to claim 3, wherein the object of interest is tracked by maintaining position information related to its position in each frame.

5. A method according to claim 4, wherein the position information is updated for each frame.

6. A method according to claim 1, further including the steps of:
    providing predetermined identification information related to one or more classes of objects likely to be identified in the time-sequential digital signal;
    attempting to identify the object of interest with reference to the identification information; and
    in the event that the object of interest is identified, associating the identification information with the link between the object of interest and the at least one metadata element.

7. A system for generating a hypertext metadata object having links to temporal and spatial extents in a time-sequential digital video signal defining a series of frames, the system including:
    a video source including means for generating the time-sequential digital video signal defining a series of frames;
    image processing means for identifying an object of interest having temporal and spatial extents within one or more frames in the digital video signal, the object of interest being identified upon the object of interest being first detected in a frame of the digital video signal;
    metadata element creating means for creating at least one metadata element in the hypertext metadata object; and
    link entity means for defining a link entity between the object of interest and the at least one metadata element, wherein the image processing means are configured to track the object of interest during subsequent frames in the series, whilst the link entity means maintains the link entity between the said object of interest in each frame and the at least one metadata element.

8. A system according to claim 7, wherein the system further includes:
    storage means for storing predetermined identification information related to one or more classes of objects likely to be identified in the time-sequential digital video signal; and
    identification means for using the predetermined identification information to recognise the object of interest, whereby, upon recognition of the object of interest, metadata corresponding specifically to the object of interest is linked by a link entity thereto.

9. A system according to claim 7 or 8, wherein the video source is a video camera.

10. A system according to claim 9, wherein the video camera includes position detection means for generating a movement signal indicative of relative panning or zooming movements of the video camera.

11. An apparatus for generating a hypertext metadata object having links to temporal and spatial extents in a time-sequential digital video signal, the apparatus including:
    a video source including means for generating the time-sequential digital video signal defining a series of frames;
    image processing means for identifying an object of interest having temporal and spatial extents within one or more frames in the digital video signal, the object of interest being identified upon the object of interest being first detected in a frame of the digital video signal;
    metadata element creating means for creating at least one metadata element in the hypertext metadata object; and
    link entity means for defining a link entity between the object of interest and the hypertext metadata object, wherein the image processing means are configured to track the object of interest during subsequent frames in the series, whilst the link entity means maintains the link entity between the object of interest in each frame and the at least one metadata element.

12. An apparatus according to claim 11, wherein the apparatus further includes:

storage means for storing predetermined identification information related to one or more classes of objects likely to be identified in the time-sequential digital video signal; and identification means for using the predetermined identification information to recognize the object of interest, whereby, upon recognition of the object of interest, metadata corresponding specifically to the object of interest is linked by a link entity thereto.

13. An apparatus according to claim 11 or 12, wherein the video source is a video camera.

14. An apparatus according to claim 13, wherein the video camera includes position detection means for generating a movement signal indicative of relative panning or zooming movements of the video camera.

15. A computer programming product with a computer readable medium recorded thereon for generating a hypertext metadata object having links to temporal and spatial extents in a time-sequential digital signal, said computer programming product including:

an identifying module for identifying an object of interest in the time-sequential digital signal upon the object of interest being first detected in the time-sequential digital signal;

a metadata element creating module for creating at least one metadata element in the hypertext metadata object;

a defining module for defining a link entity between metadata in the at least one metadata element and the object of interest, the link entity forming part of the hypertext metadata object;

a tracking module for tracking the object of interest in the time-sequential digital signal and updating the link entity in the hypertext metadata object to include a new temporal and spatial extent of the object of interest in the time-sequential digital signal; and an associating module for associating the hypertext metadata object with the time sequential digital signal.

16. A computer programming product according to claim 15, wherein the time sequential digital signal defines a series of video frames and the object of interest is identified on the basis of movement against a relatively stationary background in the frames.

17. A computer programming product according to claim 16, wherein the object of interest is identified by comparing two or more relatively closely temporally spaced video frames from the series of video frames.

18. A computer programming product according to claim 17, wherein the object of interest is tracked by maintaining position information related to its position in each frame.

19. A computer programming product according to claim 18, wherein the position information is updated for each frame.

20. A computer programming product according to claim 15, further including:

an identification information module for providing predetermined identification information related to the predetermined metadata and one or more objects likely to be identified in the time-sequential digital signal; and an identification module for attempting to identify the object of interest with reference to the identification information, said identification module associating the identification information with the link between the object of interest and the at least one metadata element, upon the object of interest being identified.

21. A method of linking a hypertext metadata object with a time sequential digital signal defining a series of frames, the method including the steps of:

utilizing a detected difference between two or more relatively closely spaced frames in the series to detect an object of interest in the form of a coherent motion block moving relative to a background in the frames;

creating at least one metadata element in the hypertext metadata object;

defining a link entity between the object of interest and the at least one metadata element; and tracking the object of interest during subsequent frames in the series, whilst maintaining the link entity between the object of interest in each frame and the at least one metadata element.

22. A method according to claim 21, wherein the object of interest is tracked by maintaining position information related to a position of the object of interest in each frame.

23. A method according to claim 22, wherein the position information is updated for each frame.

24. A method according to any one of claims 21 to 23, further including the steps of:

providing predetermined identification information related to the hypertext metadata object and one or more objects likely to be detected in the time sequential digital signal;

attempting to identify the object of interest with reference to the identification information; and in the event that the object of interest is identified, defining the link entity between the object of interest and the at least one metadata element on the basis of the identification information.

25. A system for linking a hypertext metadata object with a time-sequential digital video signal defining a series of frames, the system including:

a video source including means for generating the time-sequential digital video signal defining the series of frames;

image processing means for utilising a detected difference between two or more relatively closely spaced frames in a series to detect an object of interest in the form of a coherent motion block moving relative to a background in the frames;

metadata element creating means for creating at least one metadata element in the hypertext metadata object; and link entity means for defining a link entity between the object of interest and the at least one metadata element, wherein the image processing means are configured to track the object of interest during subsequent frames in the series, whilst the link entity means maintains the link entity between the object of interest in each frame and the at least one metadata element.

26. A system according to claim 25, further including:

storage means to store predetermined identification information related to one or more classes of objects likely to be detected in the time-sequential digital video signal; and identification means for using the predetermined identification information to recognise the moving coherent block, whereby, upon recognition of the object of interest, the at least one metadata element corresponding specifically to the object of interest is linked by a link entity thereto.

27. A system according to claim 25 or 26, wherein the video source is a video camera.

28. A system according to claim 27, wherein the video camera includes position detection means for generating a movement signal indicative of relative panning or zooming of the video camera.

29. A method of isolating and tracking one or more predetermined objects in a time-sequential digital signal defined by a series of video frames, the method including the steps of:

determining an object motion field of a frame relative to a background thereof, the motion field being characterised by a plurality of motion indicators, each of which represents a motion of a spatial region of a plurality of regions of the frame;

grouping relatively closely adjacent regions having corresponding motion indicators within a predetermined threshold range of values into one or more object regions; and tracking each object region during subsequent video frames of the series, whilst maintaining a link entity between at least one object region in each frame and a metadata element configured within a hypertext metadata object.

30. A method according to claim 29, wherein the spatial region is a pixel.

31. A method according to claim 29 or 30, wherein the grouping step utilises a region growing method.

32. A method according to claim 29, wherein the motion indicators are motion vectors.

33. A method of tracking one or more objects in a time-sequential digital signal originally captured by a capture device, the method including the steps of:

determining a motion vector field for selected time instances of the time sequential digital signal;

removing components arising from motion of the capture device during capture from the motion vector field, thereby to generate an object motion field;

identifying regions of coherent motion in the object motion field, thereby to identify corresponding moving objects;

selecting one or more of the moving objects; and applying an image processing tracking method to each selected object so as to track each selected object during subsequent time instances of the time-sequential digital signal, whilst maintaining a link entity between at least one of the selected objects and at least one metadata element configured within a hypertext metadata object.

34. A method according to claim 33, wherein the method of identifying regions of coherent motion in the object motion field uses a region growing method.

35. A method according to claim 33 or 34, wherein each instance of the time sequential digital signal is a video frame.

36. A method according to any one of claims 33 to 34, wherein the motion vector field is determined for each video frame.

37. A method according to any one of claims 33 or 34, wherein metadata is created or provided for each tracked object and stored in the hypertext metadata object having links to spatio-temporal extents in the time-sequential digital signal which contain the at least one selected object being tracked.

38. A method according to any one of claims 33 or 34, further including the steps of:

providing predetermined identification information related to the metadata and one or more objects likely to be detected in the time-sequential digital signal;

attempting to identify the at least one selected object with reference to the identification information; and in the event the at least one selected object is identified, associating the identification information with the at least one selected object and the hypertext metadata object.

39. An apparatus for linking a hypertext metadata object with a time-sequential digital video signal defining a series of frames, the apparatus including:

a video source including means for generating the time-sequential digital video signal defining the series of frames;

image processing means for utilising a detected difference between two or more relatively closely spaced frames in a series to detect an object of interest in the form of a coherent motion block moving relative to a background in the frames;

metadata element creating means for creating at least one metadata element in the hypertext metadata object; and link entity means for defining a link entity between the object of interest and the at least one metadata element, wherein the image processing means is configured to track the object of interest during subsequent frames in the series, whilst the link entity means maintains the link entity between the object of interest in each frame and the at least one metadata element.

40. An apparatus according to claim 39, further including:

storage means for storing predetermined identification information related to one or more classes of objects likely to be detected in the time-sequential digital video signal; and identification means for using the predetermined identification information to recognize the moving coherent block, whereby, upon recognition of the object of interest, the at least one metadata element corresponding to the object of interest is linked by a link entity thereto.

41. An apparatus according to claim 39 or 40, wherein the video source is a video camera.

42. An apparatus according to claim 41, wherein the video camera includes position detection means for generating a movement signal indicative of relative panning or zooming of the video camera.

43. A computer programming product with a computer readable medium recorded thereon for linking a hypertext metadata object with a time sequential digital signal defining a series of frames, said computer programming product including:

a utilising module for utilising a detected difference between two or more relatively closely spaced frames in the series to detect an object of interest in the form of a coherent motion block moving relative to a background in the frames;

a metadata element creating module for creating at least one metadata element in the hypertext metadata object;

a defining module for defining a link entity between the object of interest and the at least one metadata element; and a tracking module for tracking the object of interest during subsequent frames in the series, whilst maintaining the link entity between the object of interest in each frame and the at least one metadata element.

44. A computer programming product according to claim 43, wherein the object of interest is tracked by maintaining position information related to a position of the object of interest in each frame .

45. A computer programming product according to claim 44, wherein the position information is updated for each frame.

46. A computer programming product according to any one of claims 43 to 45, further including:

a providing module for providing predetermined identification information related to the hypertext metadata object and one or more objects likely to be detected in the time sequential digital signal;

an identifying module for attempting to identify the object of interest with reference to the identification information; and in the event that the object of interest is identified, defining the link entity between the object of interest and the at least one metadata element on the basis of the identification information.

\* \* \* \* \*

UNITED STATES PATENT AND TRADEMARK OFFICE
CERTIFICATE OF CORRECTION

PATENT NO. : 6,711,590 B1
DATED : March 23, 2004
INVENTOR(S) : Alison Joan Lennon It is certified that error appears in the above-identified patent and that said Letters Patent is hereby corrected as shown below:

Sheet No 3,
Figure 3, "FINALISE" should read -- FINALIZE --.

Column 2,
Line 47, "signal;" should read -- signal; and --.
Line 61, "recognise" should read -- recognize --.

Column 3,
Line 13, "signal;" should read -- signal; and --.
Lines 43 and 58, "utilising" should read -- utilizing --.

Column 4,
Line 33, "An" should read -- an --.
Line 40, "utilising" should read -- utilizing --.
Line 54, "time sequential" should read -- time-sequential --.
Line 56, "utilising" (both occurrences) should read -- utilizing --.

Column 6,
Line 40, "applies." should read -- applies --.

Column 7,
Line 64, "etc)" should read -- etc.) --.

Column 10,
Line 5, "finalised" should read -- finalized --.
Line 35, "recognised" should read -- recognized --.

Column 11,
Line 32, "recognise" should read -- recognize --.

Column 12,
Line 2, "is.completed," should read -- is completed, --.
Line 17, "customised" should read -- customized --.
Line 43, "embodiments.are" should read -- embodiments are --.

Column 13,
Line 28, "practised" shoud read -- practiced --.

UNITED STATES PATENT AND TRADEMARK OFFICE
CERTIFICATE OF CORRECTION

PATENT NO. : 6,711,590 B1
DATED : March 23, 2004
INVENTOR(S) : Alison Joan Lennon It is certified that error appears in the above-identified patent and that said Letters Patent is hereby corrected as shown below:

<u>Column 18,</u>
Lines 23 and 61, "means are" should read -- means is --.
Line 34, "recognise" should read -- recognize --.

<u>Column 19,</u>
Lines 36, 38 and 66, "time sequential" should read -- time-sequential --.

<u>Column 20,</u>
Line 22, "time sequential" should read -- time-sequential --.
Line 36, "utilising" should read -- utilizing --.
Line 45, "means are" should read -- means is --.

<u>Column 21,</u>
Line 22, "utilises" should read -- utilizes --.
Lines 29 and 49, "time sequential" should read -- time-sequential --.

<u>Column 22,</u>
Line 11, "utilising" should read -- utilizing --.
Line 46, "time sequential" should read -- time-sequential --.
Line 49, "utilising" (both occurrences) should read -- utilizing --.

<u>Column 23,</u>
Line 9, "time sequential" should read -- time-sequential --.

Signed and Sealed this

Thirty-first Day of August, 2004

JON W. DUDAS
*Director of the United States Patent and Trademark Office*